(12) United States Patent
Schwartz

(10) Patent No.: US 8,456,137 B2
(45) Date of Patent: Jun. 4, 2013

(54) CURRENT SENSING CIRCUIT DISCONNECT DEVICE AND METHOD

(76) Inventor: Robert M. Schwartz, Miami, FL (US)

( * ) Notice: Subject to any disclaimer, the term of this patent is extended or adjusted under 35 U.S.C. 154(b) by 176 days.

(21) Appl. No.: 12/843,151

(22) Filed: Jul. 26, 2010

(65) Prior Publication Data

US 2011/0018497 A1     Jan. 27, 2011

Related U.S. Application Data

(60) Provisional application No. 61/228,213, filed on Jul. 24, 2009.

(51) Int. Cl.
| | |
|---|---|
| *H02J 7/00* | (2006.01) |
| *H02H 3/00* | (2006.01) |
| *H02H 1/00* | (2006.01) |
| *H01F 27/42* | (2006.01) |

(52) U.S. Cl.
USPC ........... 320/137; 320/108; 320/107; 361/102; 361/114

(58) Field of Classification Search
USPC ... 320/108, 107, 113, 115; 307/104; 361/102, 361/114
See application file for complete search history.

(56) References Cited

U.S. PATENT DOCUMENTS

| | | | | |
|---|---|---|---|---|
| 4,070,699 | A | * | 1/1978 | Einbinder ...................... 361/86 |
| 5,315,533 | A | * | 5/1994 | Stich et al. .................... 700/298 |
| 5,550,437 | A | * | 8/1996 | Hopkins et al. ............ 315/209 R |
| 6,373,732 | B1 | * | 4/2002 | Patel et al. ...................... 363/72 |
| 6,940,257 | B2 | * | 9/2005 | Planells Almerich ........ 320/137 |
| 2007/0217234 | A1 | * | 9/2007 | Nakamura ...................... 363/79 |
| 2008/0290834 | A1 | * | 11/2008 | Umetsu ......................... 320/107 |
| 2009/0033291 | A1 | * | 2/2009 | Aradachi et al. .............. 320/150 |

OTHER PUBLICATIONS

Y.M. Anandavardhana, Auto Turn-Off Battery Charger, Electronics for You, Feb. 2005, www.efymag.com.

\* cited by examiner

*Primary Examiner* — M'Baye Diao
(74) *Attorney, Agent, or Firm* — Robert M. Schwartz

(57) ABSTRACT

A device and method are provided for mechanically breaking a circuit in a battery charging device when the charger is determined to be in a standby or idle mode of operation, after which the circuit must be manually reset in order to further use the device.

10 Claims, 2 Drawing Sheets

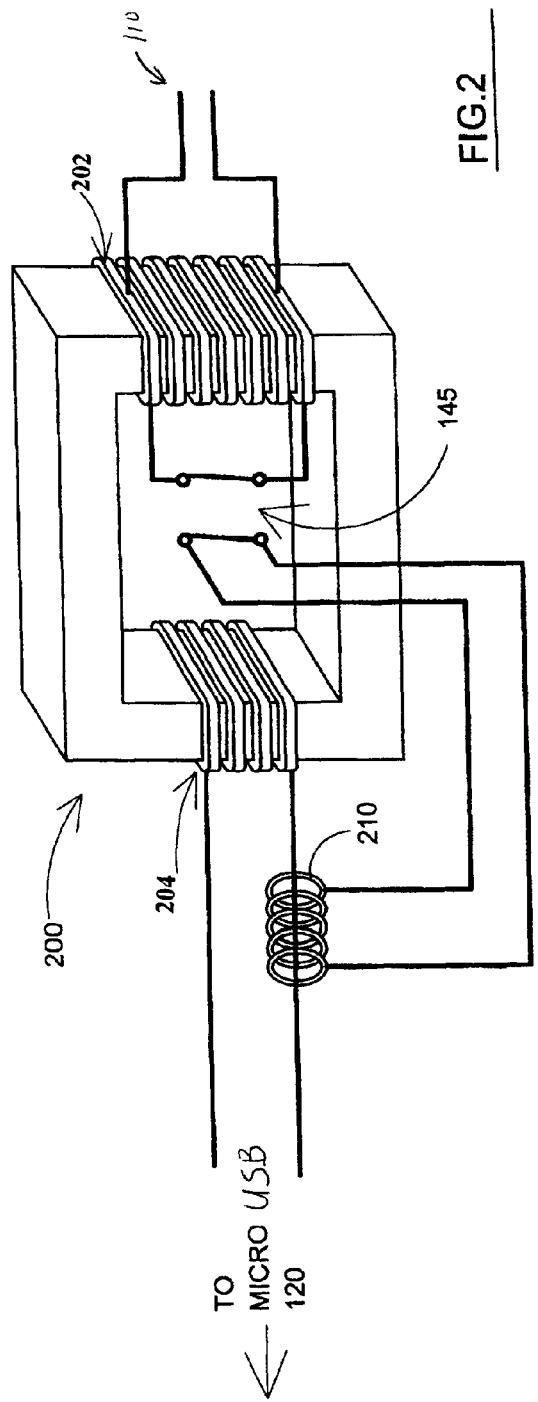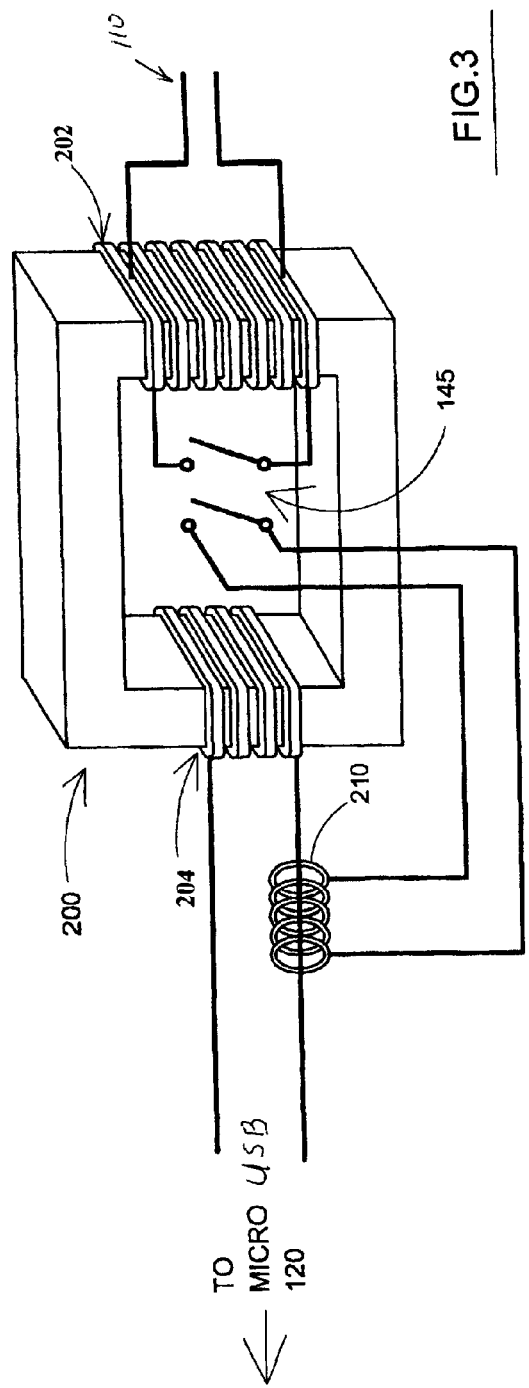

CURRENT SENSING CIRCUIT DISCONNECT DEVICE AND METHOD

CROSS-REFERENCE TO RELATED APPLICATIONS

This application claims priority to U.S. Provisional Application No. 61/228,213 filed on Jul. 24, 2009, the disclosure of which is incorporated herein by reference in its entirety.

FIELD OF THE INVENTION

The invention relates to a device and method for disconnecting a circuit when a significantly reduced current flow is sensed.

DESCRIPTION OF THE RELATED ART

Recently, significant concerns have been raised by the environmental impact of wasted electricity. In particular the use of energy by devices standing in idle mode or standby mode has been criticized as using electricity to no purpose, and thus wasting the electricity and the valuable resources used to generate it.

One particular example of wasted energy can be seen with battery chargers of all kinds, including those associated with such devices as laptop computers, power tool and portable, mobile and/or cellular telephones. These charging devices exhibit two distinct low power modes that utilize energy, even when there is no battery to be charged. These modes are referred to as "standby" and "idle". "Standby" mode occurs when a charger is plugged in to an outlet, but there are no batteries connected to the charger (i.e., no load connected to the charger). For example, this occurs when a cell phone charger is plugged into the wall, but the cell phone is not connected to the charger. "Idle" mode occurs when no charging is taking place because the battery attached to the charger is full. It is believed that billions of kW hours are currently being wasted by battery charging devices running in the standby and idle modes. At present, people are being encouraged to physically unplug these chargers when not in use, so as to cut down on the amount of electricity wasted.

What is needed is a device that can be used to cut-off the electricity usage of devices, and in particular, of charging devices, operating in the standby and idle modes.

SUMMARY OF THE INVENTION

It is accordingly an object of the invention to provide a device that can be added to, or incorporated in, battery charging devices to mechanically break a circuit when the charger is determined to be in a standby or idle mode of operation.

Other features which are considered as characteristic for the invention are set forth in the appended claims.

Although the invention is illustrated and described herein as embodied in a current sensing circuit disconnect device and method, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

BRIEF DESCRIPTION OF THE DRAWING

The present invention is illustrated by way of example, and not by way of limitation, in the figures of the accompanying drawings, in which like reference numerals refer to similar elements and in which:

FIG. 2 is a partial circuit diagram useful for illustrating one particular embodiment of the instant invention wherein current is flowing in the primary and secondary of a transformer because the coil senses in the secondary of the transformer and the switch is closed.

FIG. 3 shows the partial circuit diagram of FIG. 2, having the switches open in accordance with one particular embodiment of the instant invention wherein no current is flowing in the primary or secondary of a transformer because the coil does not sense current in the secondary transformer and the switch is open.

DESCRIPTION OF THE PREFERRED EMBODIMENTS

Figure 1:
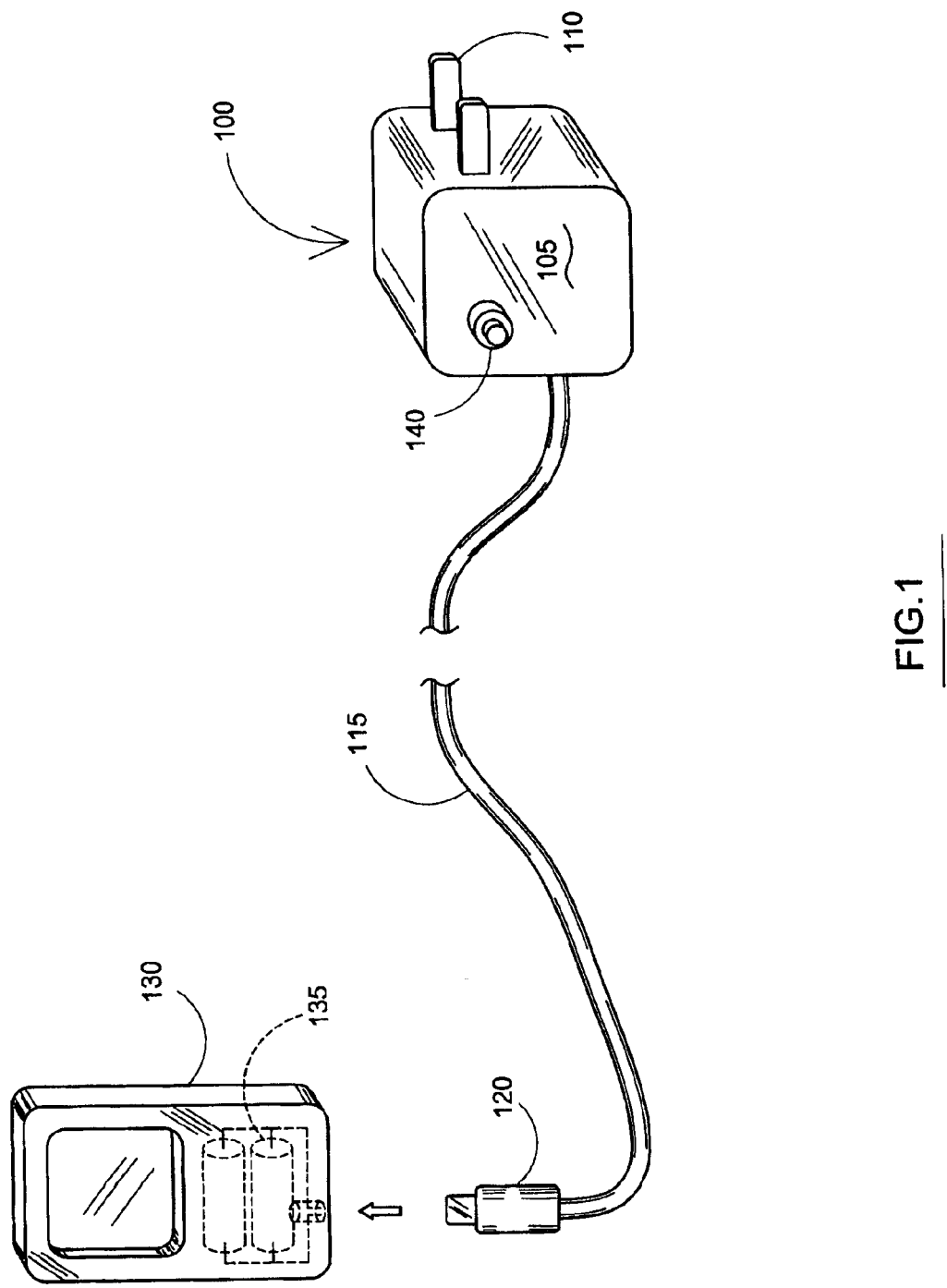
FIG. 1 is an isometric view of a device in accordance with one particular embodiment of the instant invention.

Referring now to FIGS. 1-3, there is shown an illustration of a device 100 made in accordance with one particular embodiment of the instant invention. In the particular example shown in FIG. 1, the device 100 is a cell phone charger incorporating the traditional mobile phone charger elements. Applicant notes that this is not meant to be limiting, as it will be seen how the present invention can be adapted for other kinds of charging devices (i.e., for rechargeable batteries, laptop computers, power tools, etc.) that operate in standby and idle modes.

Referring back to FIGS. 1-3, the charger 100 includes a plug 110 that permits the charger 100 to be plugged into, and coupled with, a wall outlet (not shown). Thus, the charger 100 is connected to Mains, which in the United States is 120 V AC. A charging device 100, as shown, takes the 120 AC and down converts it, using a transformer 200 having a magnetic core with a primary coil 202 for connection to the 110/120 volt alternating current in the wall outlet or mains and a secondary coil 204. The charger 100 further includes a connector 120 such as a micro USB connector that provides a DC charging voltage to a phone 130, when connected. As such, the charging circuit of the charger 100 also includes an AC/DC converter (not shown) connected to the secondary of the transformer 200, to convert the down-converted AC to DC, so as to provide a DC charging current from the connector 120.

Note that the connector 120 may be any form of connector, as desired to connect the phone 130 to the charger 100. However, in the presently described embodiment, the connector 120 is illustrated as a micro-usb connector, in accordance with the recently introduced universal cell phone charger agreement. The connector 120 is shown as being at a distance from the body 105 of the charger 100, but note that such distance can be as small or as large as desired. In particular in one embodiment, the cord 115 is only a few inches, and it is envisioned that the plug 110 will be connected to a wall outlet via an extension cord. Alternately, the cord 115 can be several feet in length, so that the plug 110 can be directly plugged into an outlet, while the connector 120 is spaced from the outlet.

In accordance with one particular embodiment of the instant invention, the body 105 of the charger 100 additionally includes a mechanical reset button 140, that may include an indicator light that the charger is active, that is used to manually reset a switch 145 triggered by the circuit of the instant invention. Referring more particularly to FIGS. 2-3, the instant invention operates on the principle of mechanically breaking or opening the circuit between the wall outlet and the primary coil 202 of the transformer 200 when it is determined that no or very low current is drawn from the secondary coil 204 of the transformer 200. Once the circuit is broken or opened at this location, the circuit will not be able to draw any more current until the mechanical button 140 is reset, thus closing the switch 145.

In particular, a current sensing device 210, such as a current sensing coil 210 or resistance, is placed in close proximity to, or in the path from, the output wires of the secondary coil 204 of the transformer 200. Alternately, the current sensing device 210 can be placed after the AC/DC converter, if desired. When a mobile phone 130 is initially connected to the connector 120, the charger 100 is in active mode and current is drawn from the secondary until the battery 135 of the mobile phone 130 connected to the charger 100 is fully charged. The current sensing device 210 measures the current being drawn over the cord 115 and, for so long as current is being drawn via the connector 120, the current sensing device 210 provides an output that maintains the switch 145 closed. However, once the battery 135 is fully charged, or the phone 130 is disconnected from the connector 120, current ceases to be drawn from the secondary coil 204 of the transformer 200 over the cord 115. Once the current sensing device 210 senses that the current draw has dropped off significantly, or even that no current is being drawn at the connector 120, the current sensing device 210 signals the switch 145 to open. Thus opening the connection between the primary coil 202 of the transformer 200 and the plug 110, and breaking or opening the circuit. When the switch 145 is open, the charger 100 has an open circuit and no power is used thereby. To restart or close the circuit, the user must reconnect a phone 130 in need of a charge and manually reset the reset button 140, thus closing the switch 145 and reconnecting the primary coil 202 to the household AC mains. This manual switch breaks or opens the circuit connection between the household mains and the primary coil 202 of the transformer 200 without necessitating the charger 100 be unplugged from the wall.

Additionally, the switch 145 is illustrated as double-pole double throw mechanical switch in FIGS. 2 and 3, but any type of switch or relay that can be operated to open the circuit between the primary coil 202 of the transformer 200 and the plug 110 can be used. For example, a relay can be provided in place of switch 145, which relay is energized by the output of the current sensing device 210, and which normally opens when current is not provided from the current sensing device 210 (i.e., when there is no current drawn from the secondary coil 204). Further, additional circuitry can be provided to open the switch 145 once the current sensed by the current sensing device 210 drops below a predetermined level.

Note that the above-described embodiments are exemplary and that the above invention is not meant to be limited only to its preferred embodiments. It can be seen that other modifications can be made to the preferred embodiments and still be within the spirit of the present invention.

I claim:

1. A charging device, comprising:
   a mechanical switch located in the circuit of a primary coil of a transformer used in the charging device; and
   a current sensing device for monitoring the current drawn from a secondary coil of the transformer, the switch being opened when the current sensing device determines that no current is being drawn from the secondary coil.

2. A method for disconnecting a charging device, comprising:
   providing a mechanical switch located in the circuit of the primary coil of a transformer used in the charging device; and
   opening the mechanical switch when the current sensing device determines that no current is being drawn from the secondary coil, and
   manually actuating said mechanical switch to permit current flow.

3. A charging device, comprising:
   a connector for connection to a load, the connector receiving a current from a charger circuit;
   the charger circuit including a transformer and a mechanical switch located in the circuit of a primary coil of the transformer; and
   a current sensing device for monitoring the current drawn from the connector, the switch being opened when the current sensing device determines that the current being drawn from the connector is below a predetermined level.

4. A charging device as in claim 1 wherein said mechanical switch is configured to require manual actuation to permit current flow.

5. A charging device as in claim 4 wherein said manual actuation is by an actuator button.

6. A charging device as in claim 4 wherein said manual actuation is by connection of a cell phone to said secondary coil.

7. A charging device as in claim 3 wherein said mechanical switch is configured to require manual actuation to close said mechanical switch and permit current flow.

8. A charging device as in claim 7 wherein said manual actuation is by an actuator button.

9. A charging device as in claim 7 wherein said manual actuation is by connection of a load to said connector.

10. A charging device as in claim 9 wherein said load is a cell phone.

* * * * *